United States Patent
Gruber et al.

(10) Patent No.: US 11,325,676 B2
(45) Date of Patent: May 10, 2022

(54) ELECTRIC DRIVE DEVICE FOR A BICYCLE

(71) Applicant: ALPINE DRIVE GMBH, Innbruck-Igls (AT)

(72) Inventors: Martin Gruber, Vienna (AT); Reinhold Gruber, Natters (AT)

(73) Assignee: ALPINE DRIVE GMBH, Innsbruck-Igls (AT)

( * ) Notice: Subject to any disclaimer, the term of this patent is extended or adjusted under 35 U.S.C. 154(b) by 228 days.

(21) Appl. No.: 16/755,248

(22) PCT Filed: Oct. 9, 2018

(86) PCT No.: PCT/AT2018/000084
§ 371 (c)(1),
(2) Date: Apr. 10, 2020

(87) PCT Pub. No.: WO2019/071280
PCT Pub. Date: Apr. 18, 2019

(65) Prior Publication Data
US 2020/0269951 A1  Aug. 27, 2020

(30) Foreign Application Priority Data

Oct. 11, 2017 (EP) .................................. 17450011

(51) Int. Cl.
 *B62M 6/60* (2010.01)
 *B62L 1/00* (2006.01)
 *B62M 11/10* (2006.01)
(52) U.S. Cl.
 CPC .............. *B62M 6/60* (2013.01); *B62L 1/005* (2013.01); *B62M 11/10* (2013.01)

(58) Field of Classification Search
 CPC ........... B62M 6/60; B62M 6/25; B62M 11/10
 USPC ....................................... 180/206.5
 See application file for complete search history.

(56) References Cited

U.S. PATENT DOCUMENTS

| | | | |
|---|---|---|---|
| 1,297,218 A * | 3/1919 | Merkel | B62K 11/04 180/228 |
| 5,368,122 A | 11/1994 | Chou | |
| 5,433,284 A * | 7/1995 | Chou | B62M 6/60 180/206.5 |
| 2004/0065495 A1 | 4/2004 | Huang | |

FOREIGN PATENT DOCUMENTS

| | | | |
|---|---|---|---|
| CN | 102501938 A * | 6/2012 | ............. B62M 6/60 |
| DE | 102010026405 A1 | 1/2012 | |

OTHER PUBLICATIONS

International Preliminary Examination Report dated Sep. 19, 2019 issued in corresponding International Patent Application No. PCT/AT2018/000084 (14 pgs.).

(Continued)

*Primary Examiner* — Kevin Hurley
*Assistant Examiner* — Hosam Shabara
(74) *Attorney, Agent, or Firm* — Pillsbury Winthrop Shaw Pittman, LLP

(57) ABSTRACT

In an electric drive device for a bicycle, there is an electric motor with an output shaft and an angular gear by which the output shaft is connectable to a wheel of the bicycle in a drive-effective manner, and a fastening device is provided, carrying the electric motor and configured to fasten the electric motor to a rotation axle of the wheel.

19 Claims, 1 Drawing Sheet

(56) References Cited

OTHER PUBLICATIONS

Figure 1:
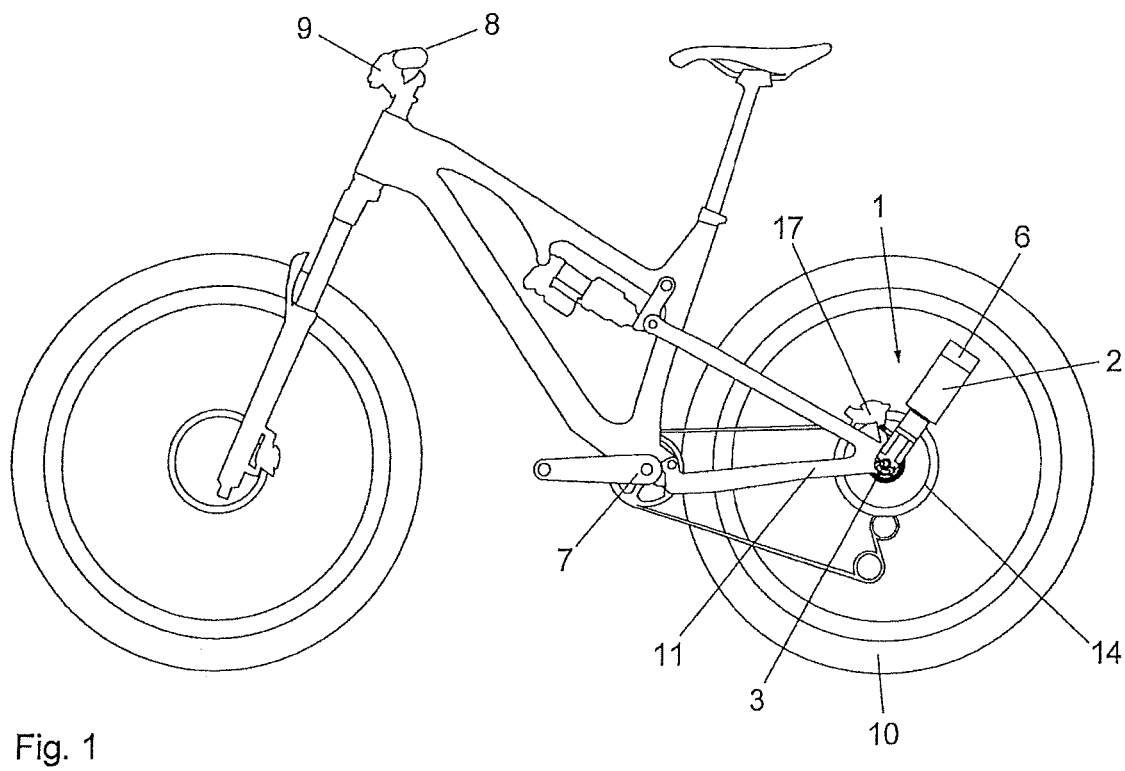

International Search Report dated Nov. 15, 2018 issued in corresponding International Patent Application No. PCT/AT2018/000084 with English translation (14 pgs.).

* cited by examiner

ELECTRIC DRIVE DEVICE FOR A BICYCLE

CROSS-REFERENCE TO RELATED APPLICATIONS

This application is a national stage entry of PCT/AT2018/000084, filed Oct. 9, 2018, which claims priority to European Application No. 17450011.6, filed Oct. 11, 2017, the entire contents of both of which are herein incorporated by reference in their entireties.

The invention relates to an electric drive device for a bicycle, comprising an electric motor with an output shaft and an angular gear, by which the output shaft can be connected to a wheel of the bicycle in a drive-effective manner.

The invention further relates to a bicycle comprising a frame, a front wheel and a rear wheel, which are each rotatably mounted on the frame, and further comprising an electric drive device.

Electric bicycles have become increasingly popular in recent years and are manufactured in a wide variety of forms and now also in large quantities worldwide. Electric bicycles, which are used on mountain routes and off-road, so-called electric mountain bikes, also have high growth rates. There are various installation variants of the electric drives in widespread use, which range from hub motors, middle motors, friction motors, crank motors to motors which are installed in the saddle or down tube of the frame. A variant is also known (DE 102010026405 A1), in which the electric motor drives the rear wheel directly via an angular gear, the driven bevel gear being fixed, for example, on the rear wheel-brake disc.

In all known design variants, the drive is either permanently and inseparably installed on the bicycle frame or can be retrofitted into an existing bicycle in a more or less complex manner.

The present invention aims to develop an electric drive device in such a way that a bicycle can easily be retrofitted with an electric drive if necessary and the drive can be removed again in a simple manner. The retrofitting and the safe functioning of the drive should also be possible or guaranteed for bicycles with movable frame parts, such as for example with bicycles with resilient rear wheel suspension.

To achieve this object, a first aspect of the invention for an electric drive device for bicycles consists essentially in that a fastening device is provided which carries the electric motor and which is configured to fasten the electric motor to a rotation axle of the wheel. The attachment of the electric motor to the rotation axle of the driven wheel ensures a defined position of the motor relative to the wheel and therefore an optimal engagement of the angular gear. In particular, the arrangement of the electric motor is unaffected by any relative movements of frame parts relative to the driven wheel. The electric drive device according to the invention can therefore also be used without difficulty for driving a resiliently suspended rear wheel.

The attachment of the fastening device to the wheel axle also enables quick assembly and disassembly of the drive, in particular a quick mounting device, such as a quick-release device, which is present or intended for fastening the wheel to the bicycle frame, can be used also for fastening the fastening device. The drive can therefore be attached and removed without tools. For the user, this has the advantage, for example, that the bicycle can be used with or without a drive as required or it enables effective theft protection.

The attachment to the rotation axle of the wheel makes it possible to arrange the drive device so that it can rotate about the rotation axle, i.e. to position it in a selectable angular orientation, and then to fix it in the selected angular orientation. As a result, the drive device can be positioned in a simple manner at the point that fits the respective bicycle frame. A variety of bike brands and types can be served. The fixation of the fastening device on the rotation axle in the desired position can preferably be done continuously with the aid of a clamp or screw connection.

In the context of the invention, the fastening of the fastening device to the rotation axle of the wheel means that the fastening device is particularly fastened to an area of the rotation axle which protrudes from the wheel hub, preferably to a free end of the rotation axle. The invention therefore does not include designs in which the drive is integrated in a wheel hub (hub motor).

The drive device according to the invention is designed for retrofitting in existing bicycles, but can of course also be installed in new bicycles and sold together with the drive.

The drive device according to the invention comprises an angular gear, by which the output shaft of the motor can be connected to a wheel of the bicycle in a drive-effective manner. The drive device is preferably attached in such a way that the output shaft of the motor extends radially to the rotation axle of the wheel. In particular, the fastening device for fastening the drive is designed such that the imaginary extension of the output shaft of the motor intersects the rotation axle of the wheel, either at an angle of 90 degrees or, in another embodiment, at an angle other than 90 degrees.

According to a preferred embodiment of the invention, the angular gear comprises a gear element which can be connected in a rotationally fixed manner to the wheel, in particular hub or a brake disc of the wheel.

The angular gear is, in particular designed as a bevel gear, the crown wheel of which is non-rotatably fastened to the wheel, in particular to a hub or a brake disc of the wheel, and the bevel gear pinion of which is arranged on the output shaft of the motor.

The angular gear is preferably not in a fixed gear housing, but the crown wheel and the bevel pinion are each arranged in separate components which are put together and separated again by the user in use by the described clamping mechanism.

a) The crown wheel is fixedly connected to the hub of the bicycle, the bicycle in this case being able to be used also without a drive, but with a crown wheel, as a normal bicycle.

b) The bevel inion is fixedly connected to the electric motor. Only when the motor is attached to the bicycle axle by the user, both components are fixedly and non-positively connected to one another.

According to a preferred embodiment of the invention, the fastening device comprises a fastening lug which is configured for fastening to a rotation axle of the wheel, preferably rotatable about the latter. In particular, the fastening device comprises holding means for the electric motor from which the fastening lug extends away, preferably parallel to the output shaft of the motor. The fastening lug preferably extends to the side of the electric motor and only on one side thereof, so that there is sufficient clearance between the fastening lug and the gear element, in particular the crown wheel, for the arrangement of the drive pinion, in particular bevel gear pinion. In particular, the fastening lug extends on the side of the drive pinion facing away from the gear element, in particular the crown wheel. The fastening lug can be pushed onto or fastened to the end region of the rotation axle, which projects outwards from a frame part, in particular a dropout, of the bicycle. In other words, the rotation axle of the wheel reaches through the frame part, in particular the dropout, of the bicycle in the axial region between the gear element, in particular the crown wheel of the angular gear and the fastening lug.

It is preferably provided here that the fastening device, in particular the fastening lug, has a recess, in particular a bore, for receiving the rotation axle of the wheel such that the axis of the recess, in particular bore, intersects the imaginary extension of the output shaft, either at an angle of 90 degrees or, in another embodiment, at an angle other than 90 degrees. The fastening lug can therefore be pushed or screwed onto the rotation axle, thereby immediately ensuring the correct alignment of the output shaft—namely intersecting the rotation axle of the wheel.

The subsequent fastening of the fastening device takes place in that the fastening device, in particular the fastening lug, has locking means for fixing its axial position on the rotation axle of the wheel. A particularly preferred embodiment is one in which the fastening lug can be pushed onto the rotation axle and, after assuming the suitable axial position, can be fixed in its axial position with the aid of the locking means.

The locking means can comprise a clamping device, in particular an eccentric clamp. If the fastening lug has a recess, in particular a bore, for receiving the rotation axle of the wheel as described above, it is preferably provided that the locking means are designed to change the diameter of the recess, in particular the bore. The bore can be formed in a slotted area of the fastening lug, so that a reduction in the slot width e.g. caused by an eccentric actuation leads to a reduction in the diameter, as a result of which, in the sense of an eccentric clamp, clamping occurs on the rotation axle of the wheel.

The aforementioned fixation preferably can also simultaneously fasten the angular orientation of the drive device, i.e. the angle of rotation about the rotation axle of the wheel, so that an anti-rotation device is created which prevents the drive device from turning around the rotation axle of the wheel due to the drive force or the reaction force.

Such an effect can alternatively or additionally also be achieved in that the fastening device has connecting means for rigid connection to a non-rotating component of the bicycle, preferably to a brake caliper, a brake caliper socket of a disc brake of the rear wheel or a part of the bicycle frame. The connecting means preferably comprise a clamping device.

If the drive device can be supported on a non-corotating component of the bicycle, a rotationally fixed attachment of the fastening device to the rotation axle of the wheel is not necessary. In this case it can therefore be provided that the fastening device is arranged on the rotation axle so as to be freely rotatable about the rotation axle of the wheel. The drive device then preferably comprises a wheel axle or an axle extension which can be attached to the wheel axle and which has a head which is rotatably mounted relative to the wheel axle and on which the fastening device can be fastened.

According to a second aspect, the invention relates to a bicycle comprising frame, a front wheel and a rear wheel, which are each rotatably mounted on the frame, and furthermore comprising an electric drive device according to the first aspect of the invention, the fastening device of which is fastened on the rotation axle of the rear wheel, wherein a gear element of the angular gear is connected in a rotationally fixed manner to the rear wheel, in particular a hub or a brake disc of the rear wheel, so that the output shaft of the electric motor is connected to the rear wheel in a drive-effective manner via the angular gear.

The imaginary extension of the output shaft preferably intersects the rotation axle of the rear wheel.

Preferably, the fastening device, in particular the fastening lug, is fixed rotationally fast on the rotation axle of the rear wheel. Alternatively, it can be provided, that the fastening device is rotationally arranged about the rotation axle, so that the fastening device is fixedly arranged on the rotation axle of the rear wheel only in the axial direction.

The fastening device is preferably fastened to a head arranged at the end of the rotation axle. For example, the head can have a larger diameter than the rest of the rotation axle. The head can be firmly connected to the rotation axle both in the axial and in the radial direction. However, it is preferably provided that the head is rotatably mounted about the rotation axle and is only axially fixed to the rotation axle. No more forces acting in the circumferential direction then have to be can be absorbed between the wheel axle and the fastening device, but only axial forces. As a result, higher forces in total can be absorbed in the axial direction. Another advantage of such a rotatable head is that unwanted rotational forces on the rotation axle, which serves to fasten the wheel hub and thus the rear wheel to the bicycle frame, are prevented. The rotational forces acting on the rotation axle could cause the axle to be unscrewed or screwed on undesirably. It is therefore preferably provided that the fastening device is attached to a head arranged at the end of the rotation axle, the head being mounted rotatably about the rotation axle.

Alternatively, the fastening device, in particular the fastening lug, is fixed in a rotationally fixed manner on the rotation axle of the rear wheel by means of the clamping device, in particular the eccentric clamp.

The fastening device is preferably rigidly connected by means of the connecting means to a non-rotating component of the bicycle, preferably to a brake caliper, a brake caliper socket of a disc brake of the rear wheel or a part of the bicycle frame.

Likewise, the connection to the bicycle frame can be not rigid, but via a shock absorber. The shock absorber can be made of rubber or a spring element. This has the advantage that occurring torque peaks, which can occur when driving over uneven ground with the bicycle, are dynamically absorbed and the forces to be introduced are reduced.

The rotation axle of the rear wheel preferably passes through the recess, in particular the bore, of the fastening device, in particular the fastening lug.

The rotation axle of the rear wheel preferably passes through a frame part, in particular a dropout, of the bicycle in the axial region between the gear element, in particular the crown wheel, of the angular gear and the fastening lug.

The gear element, in particular the crown wheel of the angular gear, and the brake disc of the rear wheel preferably have mutually aligned bores, which receive fastening means, in particular screws, for fastening to the wheel hub. As a result, the existing screw connection of the brake disc can also be used when retrofitting the bicycle with the electric drive according to the invention for fastening the crown wheel. Alternatively, an adapter can be provided in order to mount the crown wheel in a rotationally fixed manner on hubs which have no brake disk. The drive can therefore be mounted on almost any type of bike with any hub, especially simple city bikes or cargo bikes.

The invention is explained in more detail below referring to an exemplary embodiment shown schematically in the drawing.

Figure 2:
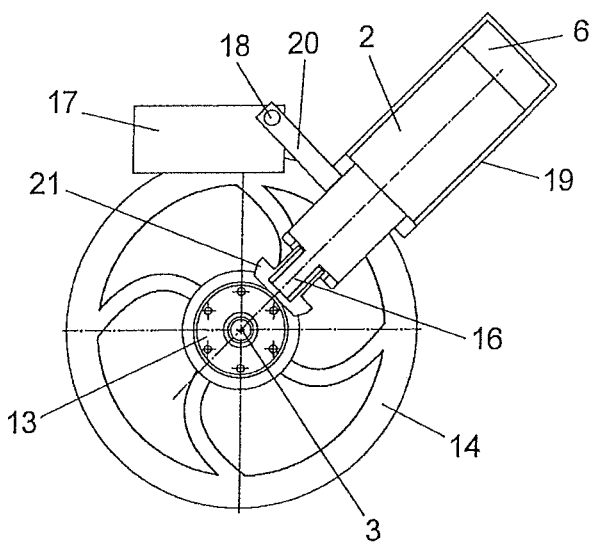
Figure 3:
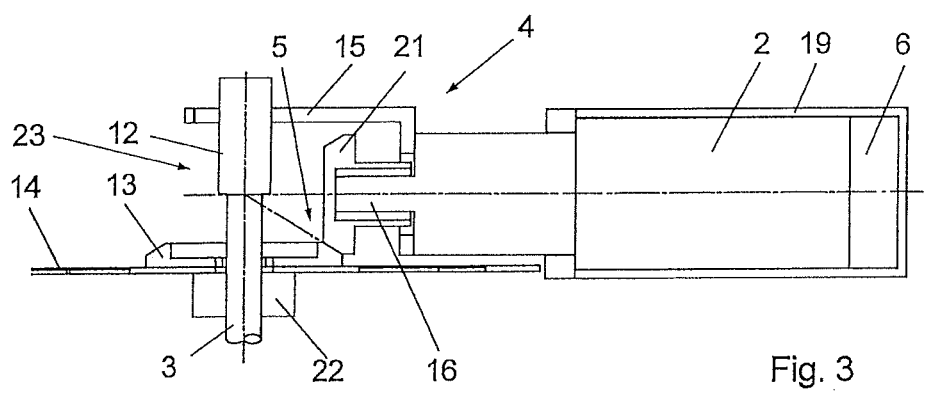

FIG. 1 shows a side view of a bicycle with a drive device arranged on the rear wheel, FIG. 2 shows a detailed view of the rear brake disk including the drive, and FIG. 3 shows a schematic sectional view of the drive device.

The drive comprises a drive unit 1, an electric motor 2, preferably a brushless DC motor, a fastening device 4 which can be fastened to the rotation axle 3 of the rear wheel of the bicycle, a bevel gear 5, an electrical control device 6, a sensor system 7 for measuring the pedal speed, a rechargeable battery (not shown) and an operating unit 8, which is preferably mounted on the handlebar 9 and which transmits the control signals either wired or wirelessly (e.g. Bluetooth) to the control unit 6.

The electric drive according to the invention drives the rear wheel 10 of the bicycle directly via the bevel gear 5. The bevel gear 5 includes the bevel gear pinion 21 on the output shaft and the bevel gearwheel (crown wheel) 13. The rear wheel 10 is usually fastened to the frame 11 with a quick-release axle, a so-called thru axle or another axle (e.g. FG 9,5, "FG" denoting a bicycle thread according to DIN 79012). According to the present invention, the existing axle, in particular quick release axle or thru axle can be exchanged for an extended rotation axle 3 in such a way that it is pushed like the standard axle through the frame 11 and the hub 22 and on the opposite side is screwed into the frame either with a nut or by means of the thread. For some axles (e.g. FG 9,5), the existing nut on the drive side is replaced by an extended rotation axle that can be attached to the wheel axle.

The elongated rotation axle 3 also has a head 12 on the drive side, which, according to the invention, serves to receive the fastening device 4 of the drive unit 1.

The driven bevel gear wheel 13 of the bevel gear 5 is preferably made such that it can be assembled together with the existing screws of the rear wheel brake disc 14. Another embodiment for bicycles without a disc brake provides that the driven bevel gear wheel 13 can be fixed on the rear wheel hub by an adapter. The diameter and thickness of the driven bevel gear wheel 13 are preferably constructed precisely so that there is space between the bicycle frame 11 and the brake disc 14 or the hub of the rear wheel. After assembly of the driven bevel gear wheel 13 and replacement of the rotation axle 3, the drive unit 1 is gradually pushed onto the axle head 12 via a hole in the fastening lug 15 of the fastening device 4 and preferably fixed with a clamp at the point which fits the precise engagement of the bevel gears, The clamping device can be integrated directly in the fastening device 4. The clamping can take place, for example, using an eccentric lever or a screw connection.

The output axle 16 of the drive unit 1 intersects the rotation axle 3 of the rear wheel 10 either at an angle of 90 degrees or, in another embodiment, at an angle other than 90 degrees. The length of the head 12 of the rotation axle 3 is preferably designed so that all common widths of bicycle frames can be served. In the area between the fastening lug 15 and the bevel gear wheel 13, the axle 3 passes through the frame (not shown in FIG. 3).

The torque forces are absorbed on the one hand via the fastening of the drive unit 1 on the axle head 12 and additionally via an off-center connection of the fastening device 4 to the bicycle frame 11, preferably via a brake caliper socket 17 present on every bicycle with a disc brake.

An embodiment of this connection can comprise a round mandrel 18 which is mounted on the brake caliper socket 17 and a perforated connecting part 20 which is rotatably mounted on the fastening device 4.

Alternatively, the axle head 12 is rotatably mounted on the axle 3 so that the torque forces are not absorbed on the axle head 12 but only via an off-center connection of the fastening device 4 to the bicycle frame for example according to the connection described above for the brake caliper mount or a simple support on a bicycle frame part.

The off-center connection to the bicycle frame 11 can preferably not be rigid, but via a shock absorber, so that the forces are absorbed dynamically. The shock absorber can be made of rubber or a spring element, for example.

The electric motor 2 is preferably accommodated in a watertight housing 19.

In a further embodiment, the control device 6 is integrated directly with the electric motor 2 in a watertight manner in the housing 19.

In a further embodiment, the control device 6 and the battery are integrated in a watertight manner in the housing 19 with the electric motor 2.

In a further embodiment, the position of the drive unit 1 is not fixed via a clamp on the axle head 12, but via a threaded sleeve, which is screwed into the motor mount and countered by means of a screw ring when the correct position for precise engagement of the bevel gears is reached and fixed to the bike frame by means of an eccentric clamp.

The invention claimed is:

1. An electric drive device for a bicycle, comprising an electric motor with an output shaft and an angular gear by which the output shaft is connectable to a wheel of the bicycle in a drive-effective manner, further comprising a fastening device carrying the electric motor and configured to fasten the electric motor to a rotation axle of the wheel, wherein the angular gear is designed as a bevel gear whose crown wheel is securable in a rotationally fixed manner to the wheel and whose bevel gear pinion is arranged on the output shaft, wherein the fastening device comprises a fastening lug, which extends only on one side of the electric motor and which is configured for fastening to the rotation axle of the wheel by arranging a frame part of the bicycle that is intersected by the rotation axle of the wheel between the fastening lug and the crown wheel and wherein the fastening device comprises locking means for fixing its axial position on the rotation axle of the wheel.

2. The electric drive device according to claim 1, characterized in that the fastening lug extends from a holding means for the electric motor, away from the electric motor.

3. The electric drive device according to claim 1, characterized in that the fastening device comprises a recess or a bore, for receiving the rotation axle of the wheel in such a manner that an axis of the recess or the bore intersects an imaginary extension of the output shaft either at an angle of 90 degrees or at an angle different from 90 degrees.

4. The electric drive device according to claim 1, characterized in that the locking means comprise a clamping device.

5. The electric drive device according to claim 1, characterized in that the fastening device comprises connecting means for rigid or elastic-connection with a non-corotating component of the bicycle.

6. The electric drive device according to claim 5, wherein the non-corotating component of the bicycle is selected from the group consisting of: a brake caliper, a brake caliper socket of a disc brake of the rear wheel, and a part of the bicycle frame.

7. A bicycle comprising a frame, a front wheel and a rear wheel, which are each rotationally mounted on the frame, and further comprising the electric drive device according to claim 1, whose fastening device is secured to the rotation axle of the rear wheel, wherein the crown wheel of the angular gear is connected in a rotationally fixed manner to the rear wheel, so that the output shaft of the electric motor is drive-effectively connected to the rear wheel via the angular gear.

8. The bicycle according to claim 7, characterized in that the imaginary extension of the output shaft intersects the rotation axle of the rear wheel.

9. The bicycle according to claim 7, characterized in that the fastening device is fixed in a rotationally fixed manner to the rotation axle of the rear wheel.

10. The bicycle according to claim 7, characterized in that the fastening device is arranged rotatably about the rotation axle.

11. The bicycle according to claim 7, characterized in that the fastening device is fixed in a rotationally fixed manner to the rotation axle of the rear wheel by a clamping device.

12. The bicycle according to claim 7, characterized in that the fastening device is fastened to a head arranged at the end of the rotation axle, wherein the head is rotatably mounted about the rotation axle.

13. The bicycle according to claim 7, characterized in that that the fastening device is rigidly or elastically connected via the connecting means to a non-corotating component of the bicycle.

14. The bicycle according to claim 13, wherein the non-corotating component is selected from the group consisting of: a brake caliper, a brake caliper socket of a disc brake of the rear wheel, and a part of the bicycle frame.

15. The bicycle according to claim 7, characterized in that the rotation axle of the rear wheel reaches through the recess of the fastening device.

16. The bicycle according to claim 7, characterized in that the rotation axle of the rear wheel reaches through a frame part of the bicycle in the axial region between the gear element of the angular gear and the fastening lug.

17. The bicycle according to claim 7, characterized in that the crown wheel of the angular gear and the brake disc of the rear wheel comprise mutually aligned bores receiving fastening means for fastening to the wheel hub.

18. An electric drive device for a bicycle, comprising:
an electric motor with an output shaft and an angular gear by which the output shaft is connectable to a wheel of the bicycle in a drive-effective manner,
further comprising a fastening device carrying the electric motor and configured to fasten the electric motor to a rotation axle of the wheel,
wherein the angular gear is designed as a bevel gear whose crown wheel is securable in a rotationally fixed manner to a hub or a brake disc of the wheel, and whose bevel gear pinion is arranged on the output shaft,
wherein the fastening device comprises a fastening lug, which extends only on one side of the electric motor and which is configured for fastening to the rotation axle of the wheel in a manner rotatable thereabout, by arranging a frame part of the bicycle that is intersected by the rotation axle of the wheel between the fastening lug and the crown wheel and
wherein the fastening device comprises locking means for fixing its axial position on the rotation axle of the wheel.

19. An electric drive device for a bicycle, comprising:
an electric motor with an output shaft and an angular gear by which the output shaft is connectable to a wheel of the bicycle in a drive-effective manner,
further comprising a fastening device carrying the electric motor and configured to fasten the electric motor to a rotation axle of the wheel,
wherein the angular gear is designed as a bevel gear whose crown wheel is securable in a rotationally fixed manner to a hub or a brake disc of the wheel, and whose bevel gear pinion is arranged on the output shaft,
wherein the fastening device comprises a fastening lug, which extends only on one side of the electric motor and which is configured for fastening to the rotation axle of the wheel in a manner rotatable thereabout, by arranging a frame part of the bicycle that is intersected by the rotation axle of the wheel between the fastening lug and the crown wheel,
wherein the fastening device comprises locking means for fixing its axial position on the rotation axle of the wheel, and
wherein the fastening lug extends from a holding means for the electric motor in parallel with the output shaft, away from the electric motor.

\* \* \* \* \*

UNITED STATES PATENT AND TRADEMARK OFFICE
CERTIFICATE OF CORRECTION

Page 1 of 1

PATENT NO. : 11,325,676 B2
APPLICATION NO. : 16/755248
DATED : May 10, 2022
INVENTOR(S) : Martin Gruber et al.

It is certified that error appears in the above-identified patent and that said Letters Patent is hereby corrected as shown below:

On the Title Page

Item (71) Applicant replace:
"Innbruck-Igls (AT)"
With:
--Innsbruck-Igls (AT)--

Signed and Sealed this
Ninth Day of August, 2022

Katherine Kelly Vidal
*Director of the United States Patent and Trademark Office*